United States Patent [19]

Ramcke et al.

[11] Patent Number: 4,508,210
[45] Date of Patent: Apr. 2, 1985

[54] APPARATUS FOR TRANSPORTING PAPER STACKS OR THE LIKE

[75] Inventors: Bernd Ramcke, Hamburg; Günther Stahl, Rellingen, both of Fed. Rep. of Germany

[73] Assignee: E.C.H. Will (GmbH & Co.), Hamburg, Fed. Rep. of Germany

[21] Appl. No.: 420,855

[22] Filed: Sep. 21, 1982

[30] Foreign Application Priority Data

Feb. 13, 1982 [DE] Fed. Rep. of Germany ....... 3205138

[51] Int. Cl.³ ............................................ B65G 15/14
[52] U.S. Cl. .................................................. 198/627
[58] Field of Search ............... 198/461, 577, 579, 627, 198/653, 654, 726, 817

[56] References Cited

U.S. PATENT DOCUMENTS 1,787,254  12/1930  Kirman et al. ....................... 198/461
3,325,977   6/1967  Kirsten ................................. 198/653
4,398,629   8/1983  Williamson .......................... 198/627

FOREIGN PATENT DOCUMENTS 2456908  8/1976  Fed. Rep. of Germany .
2092982  8/1982  United Kingdom ................ 198/627

Primary Examiner—Joseph E. Valenza
Attorney, Agent, or Firm—Peter K. Kontler

[57] ABSTRACT

An apparatus for transporting several files of spaced apart paper stacks has several neighboring transporting units, one for each file and each having a frame mounting front and rear shafts for three toothed pulleys cooperating with toothed belts whose outwardly extending lobes can advance and/or guide stacks during movement along the upper side of a platform. The lobes of the median belt in each frame are engaged by the front edge faces of the stacks, and the lobes of the outer belts in each frame engage the trailing edge faces of the stacks on the respective transporting unit. Two gears are rotatably mounted on each rear shaft to respectively drive a pulley for one of the outer belts and a pulley for the median belt in the respective transporting unit. Such gears mesh with second gears which are mounted in the respective frame, and with driver gears which are mounted on shafts receiving torque from a stepping motor. At least one of the frames is adjustable in the housing of the apparatus at right angles to the direction of transport of the stacks, and the axial length of the driver gears is such that these driver gears remain in mesh with the second gears of the one unit in each position of adjustment of the frame of the one unit with reference to the housing.

12 Claims, 4 Drawing Figures

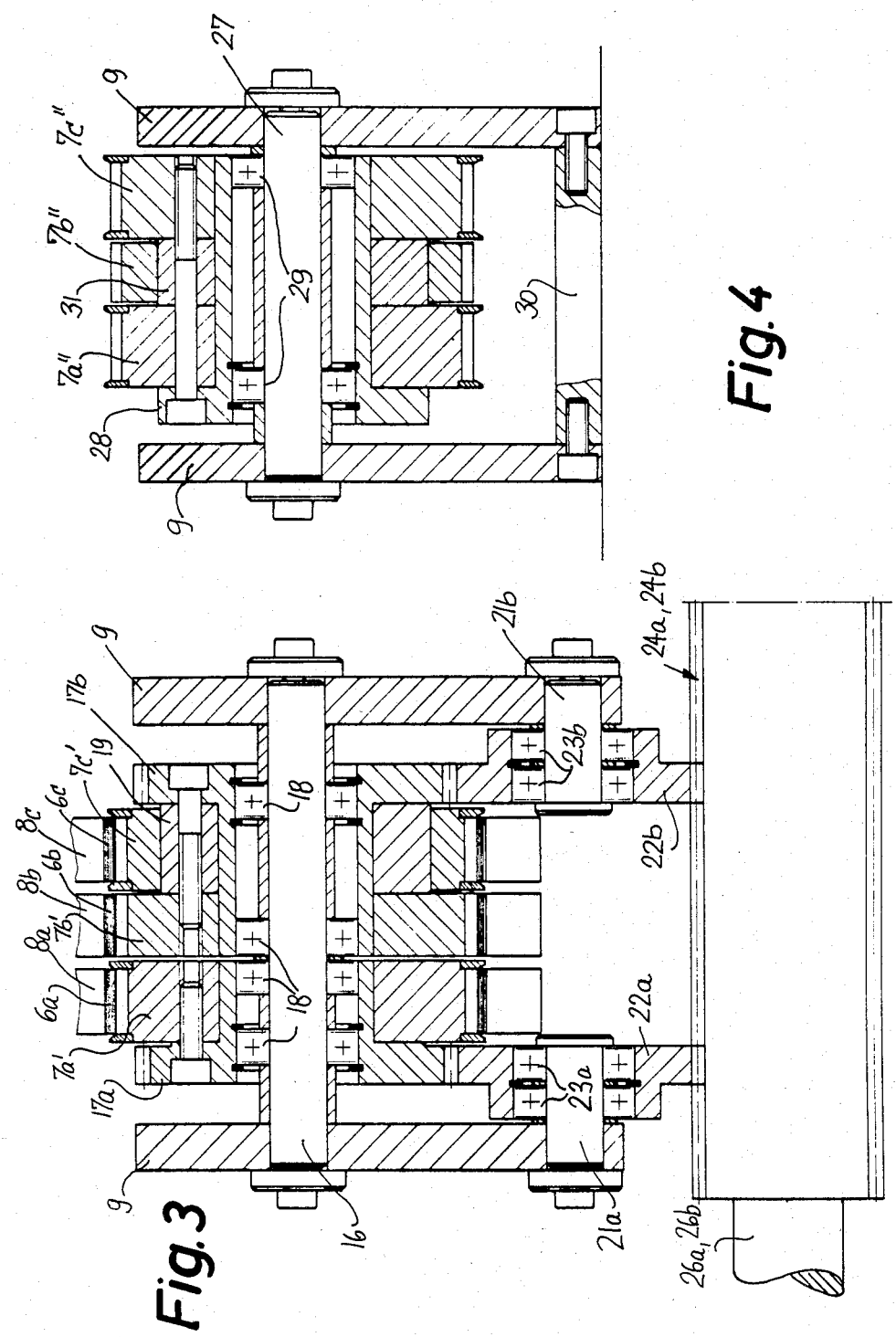

APPARATUS FOR TRANSPORTING PAPER STACKS OR THE LIKE

CROSS-REFERENCE TO RELATED CASES

The apparatus of the present invention is somewhat similar to the apparatus which is disclosed in the commonly used copending patent application Ser. No. 343,742 filed Jan. 29, 1982 by Dieter Ladewig and Bernd Ramcke for "Apparatus for intermittently transporting stacks of paper sheets or the like".

The drawing and the description of the drawing in the present application are identical with those in the commonly owned copending patent application Ser. No. 417,662 filed Sept. 13, 1982 by Bernd Ramcke for intermittently "Apparatus for transporting stacks of paper sheets or the like".

BACKGROUND OF THE INVENTION

The present invention relates to improvements in apparatus for transporting discrete commodities, particularly for intermittently transporting several files of stacks consisting of paper sheets or the like. More particularly, the invention relates to improvements in apparatus for intermittent transport of two or more files of spaced-apart stacks or piles of superimposed sheets or the like. Still more particularly, the invention relates to improvements in apparatus of the type wherein each file of stacks is transported by at least three endless conveyors in the form of belts or chains which are disposed in parallel vertical planes and are provided with entraining elements in the form of projections or lobes serving to advance as well as to locate the stacks during transport along a predetermined path.

The aforementioned commonly owned copending application Ser. No. 343,742 discloses a transporting apparatus wherein three transporting units are disposed side by side, and each such unit comprises three belts including a centrally located belt whose projections engage the front edge faces of the stacks and two outer belts whose projections engage the rear edge faces of the stacks on or above the respective transporting unit. The belts are trained around pairs of pulleys, and the drive means for the belts comprises a first shaft which transmits torque to the pulleys for the outer belts in each transporting unit and a second shaft which transmits torque to the pulleys for the centrally located belt in each unit. The two shafts receive motion from a common stepping motor.

The apparatus of the aforementioned commonly owned copending application Ser. No. 343,742 operates quite satisfactorily once a stack of paper sheets is properly located between a (leading) projection of the centrally located belt and the (trailing) projections of the outer belts forming part of a transporting unit. However, problems can arise in connection with the delivery of stacks onto the transporting units because the distance between the projections of the centrally located belt and the projections of the outer belts in each transporting unit is fixed. Therefore, it is necessary to urge the leading edge face of a freshly delivered stack against a projection of the centrally located belt while the corresponding projections of the outer belts advance from a lower level to a higher level in order to engage the trailing edge face of such freshly delivered stack. Similar problems can be encountered during removal of stacks from the path which is defined by the transporting apparatus, e.g., from the upper surface of a platform which is installed at a level above the upper reaches of the belts in each of the transporting units. As a rule, it is necessary to accelerate the stacks once the leading projections (on the respective centrally located belts) descend below the associated platforms in order to make sure that the corresponding trailing projections will have room to descend to a level below the platform during movement around the pulleys at the downstream ends of the respective transporting units. If the aforedescribed precautionary measures are not fulfilled, e.g., if the leading edge face of a stack is not urged against the projection of the centrally located belt in the respective transporting unit, the oncoming projections of the outer belts are likely to lift the rear portion of the stack with attendant shifting of sheets in the stack relative to one another. Furthermore, the rising trailing projections which are to engage the trailing edge face of a freshly delivered stack are likely to score or to otherwise deface the sheets of the stack. The trailing projections are also likely to shift the sheets of a stack at the discharge end of the respective transporting unit if the stack is not accelerated before the projections which engage its trailing edge face during transport toward the discharge end of the transporting unit begin to descend to a level below the platform without contacting the trailing edge face of the stack.

One mode of overcoming the just discussed problems is described and claimed in the aforementioned commonly owned copending patent application Ser. No. 417,662 of Bernd Ramcke.

The aforementioned copending application Ser. No. 343,742 further disclosed one mode of converting the transporting units for the treatment of longer or shorter stacks. To this end, the angular position of the first shaft with reference to the second shaft can be changed by loosening or terminating the connection between two clamping discs which are non-rotatably mounted on the first shaft and a pulley or gear which transmits torque to the first shaft. Moreover, the pulleys for the belts can be shifted axially of the respective shafts to thus increase or reduce the spacing between neighboring transporting units. This is necessary when the width of the first series of stacks deviates considerably from the width of the next series of stacks so that the spacing between neighboring units can be reduced if the width of the second series of stacks is a fraction of the width of the preceding stacks or that the spacing between the neighboring units must be increased if the width of the second series of stacks greatly exceeds the width of the previously transported stacks. A drawback of the just discussed proposal to vary the spacing between the neighboring transporting units is that it is difficult to properly align the front pulleys with the rear pulleys subsequent to a shifting of a set of such pulleys axially of the respective shafts. Moreover, the tension of the belts is likely to change during adjustment of their pulleys, and the axial shifting of pulleys often requires the exertion of considerable force, especially after a long period of operation without any adjustment.

Other attempts to improve the operation of conventional apparatus for intermittent transport of stacks of paper sheets or the like include the use of chain conveyors with adjustable pushers or analogous projections. Reference may be had to German Offenlegungsschrift No. 24 56 908. A drawback of such apparatus is that each change of setup takes up a very long interval of time with attendant losses in output, especially if the apparatus forms part of a production line for mass production of pads, books or analogous stationery products. This will be readily appreciated since each of the entraining elements (or at least a substantial number of entraining elements) must be separated from the respective chain, shifted to a different position, and reattached to the chain.

OBJECTS AND SUMMARY OF THE INVENTION

An object of the invention is to provide an apparatus for intermittent transport of stacks of paper sheets or analogous discrete commodities which is constructed and assembled in such a way that a change of setup (so that the apparatus can transport wider, narrower, longer or shorter commodities) takes up a surprisingly short interval of time.

Another object of the invention is to provide an apparatus which can simultaneously transport several files of discrete commodities and which is constructed and assembled in such a way that the units which transport such discrete commodities can be rapidly and reproducibly shifted with reference to each other in order to provide room for relatively wide commodities or to provide room for one or more additional transporting units if the width of a fresh series of commodities is less than the width of the previously transported commodities.

A further object of the invention is to provide an apparatus wherein the changes in setup can be carried out by semiskilled or even unskilled persons, wherein such changes do not necessitate the removal of any appreciable number of component parts, and wherein the number of transporting units can be increased or reduced with the same degree of facility.

An additional object of the invention is to provide a novel and improved method of converting an apparatus for intermittent transport of several files of discrete commodities into an apparatus which can transport a greater or lesser number of files.

A further object of the invention is to provide novel drive means for the rotary and otherwise movable constituents of the improved transporting apparatus.

An additional object of the invention is to provide novel transporting units for use in the improved apparatus.

Another object of the invention is to provide an apparatus which can be installed in existing production lines as a superior substitute for heretofore known apparatus serving to intermittently transport one or more files of paper stacks or the like.

The invention is embodied in an apparatus for stepwise transport of several files of discrete commodities in a predetermined direction and along a predetermined path, particularly for stepwise transport of stacks of paper sheets or the like in the form of several files wherein the stacks are disposed one behind the other. The apparatus comprises a housing and a battery of neighboring transporting units each of which comprises a frame which is mounted in the housing, more than two endless parallel conveyors (e.g., toothed belts or analogous endless flexible elements) each having at least one projection in the form of an integral or separably produced lobe arranged to extend into and from the aforementioned path in response to movement of the respective conveyor in the predetermined direction. The conveyors form a first group having at least one (preferably one) conveyor whose projection is located ahead of a commodity in the aforementioned path and a second group having preferably two conveyors which flank the conveyor of the first group and whose projections are disposed behind the commodity in the path. Each group further comprises first and second rotary elements (e.g., toothed pulleys) for each of the conveyors, and each conveyor is trained over the respective first and second rotary elements. Still further, each unit comprises first and second shaft means mounted in the respective frame and rotatably supporting the respective first and second rotary elements, and first and second gear means for rotating the rotary elements for the respective first and second groups of conveyors. The apparatus further comprises first and second driver gears which respectively mesh with the first and second gear means of all of the units, and means for intermittently rotating the driver gears. The axes of the rotary elements, of the gear means and of the driver gears extend at right angles to the predetermined direction, and the frame of at least one of the transporting units is adjustable with reference to the housing in parallelism with such axes. The axial length of the driver gears (each driver gear can be assembled of two or more sections) are such that the first and second gear means of the one unit remain in mesh with the corresponding driver gears in each position of adjustment of the frame of the one unit relative to the housing.

Each transporting unit preferably comprises first and second additional shafts (e.g., in the form of bolts mounted in the respective frame, and each of the first and second gear means can comprise a first gear mounted on the respective first shaft means and serving to drive the rotary elements for the conveyor of the respective first group and a second gear mounted on the respective additional shaft, meshing with the corresponding first gear and also meshing with the corresponding driver gear.

The means for rotating the driver gears can comprise shafts which are coaxial with the corresponding driver gears and transmit torque to their driver gears in response to reception of torque from the prime mover of a machine or production line wherein the apparatus is used, preferably through the medium of a stepping motor.

The first gear of each gear means is preferably coaxial with the first rotary elements in the respective transporting unit. The first gears of the first and second gear means in each of the transporting units respectively serve to rotate the first rotary elements for the conveyors of the first and second groups of conveyors in the respective units, and such first gears are mounted on the first shaft means of the respective units. The arrangement is preferably such that the first gear of each second gear means is rigid with the first rotary element for one of the conveyors in the respective second group and the first rotary element for the other conveyor of the respective second group is rotatably installed between the first rotary element for the conveyor of the respective first group and the first gear of the gear means which drives the rotary elements for the conveyor of the respective first group.

The second shaft means in each of the frames preferably comprises a single shaft for all of the respective second rotary elements. Each unit can further comprise a sleeve or an analogous torque transmitting device which is mounted on the respective second shaft and connects the second rotary elements for the conveyors of the respective second group. Such sleeve preferably coaxially surrounds and is rotatable relative to the corresponding second shaft. The second rotary element for the conveyor of the respective first group is then rotatably mounted on such sleeve.

The frames of the transporting units are sufficiently rigid to ensure that they can be shifted transversely of the housing without any distortion so that the conveyors of the shifted unit or units need not be realigned with the conveyors of the remaining units or unit, and that the conveyors are neither stretched nor permitted to otherwise change their condition during conversion of the apparatus for the transport of wider or narrower commodities.

The novel features which are considered as characteristic of the invention are set forth in particular in the appended claims. The improved transporting apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is an enlarged composite transverse sectional view as seen in the direction of arrows from the lines III—III and III-III' of FIG. 2, with the two sectional views shown in a common plane; and FIG. 4 is an enlarged transverse sectional view as seen in the direction of arrows from the line IV—IV of FIG. 2.

DESCRIPTION OF THE PREFERRED EMBODIMENTS

Figure 1:
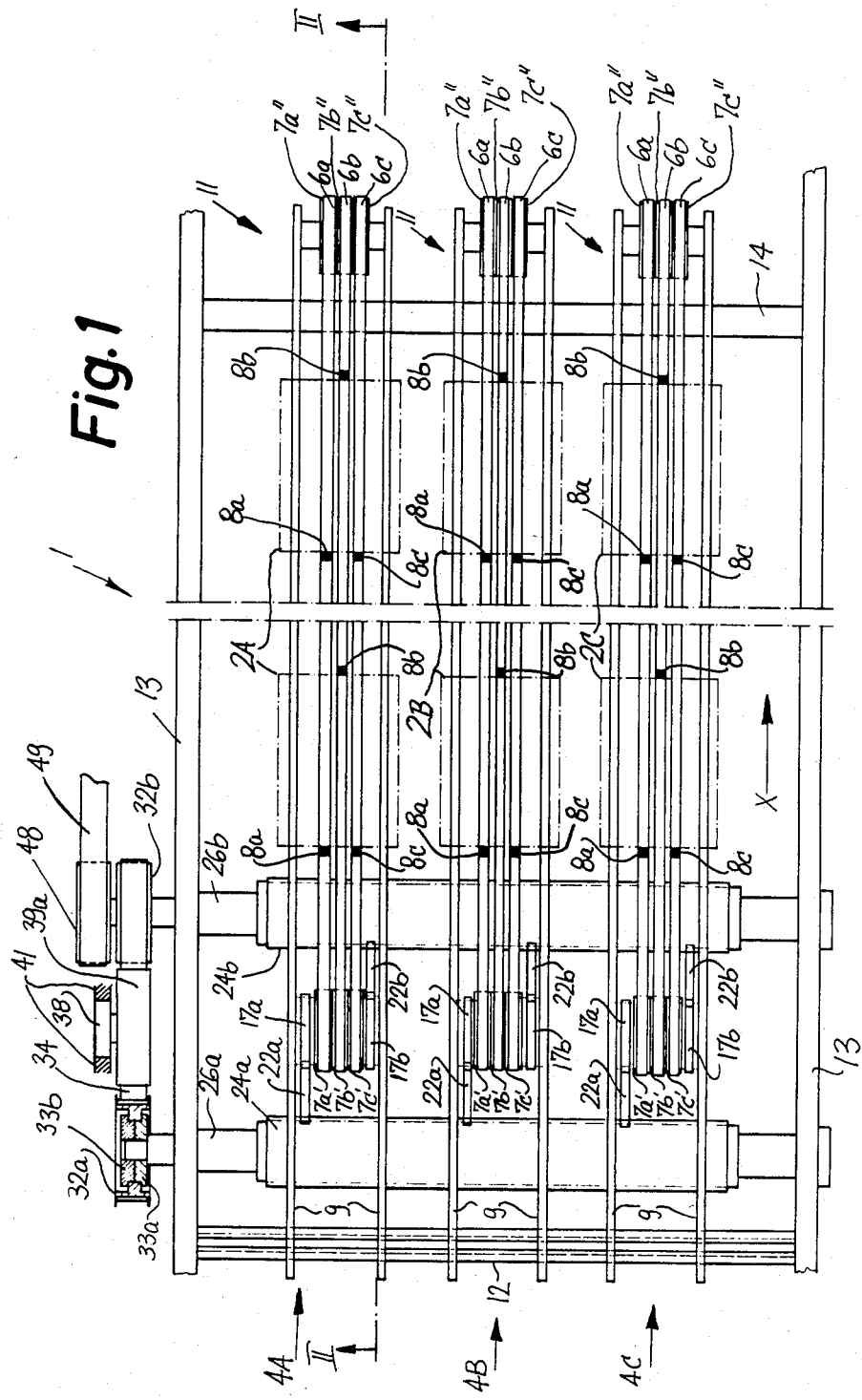
FIG. 1 is a schematic plan view of a transporting apparatus with three transporting units which embodies the present invention.

Referring first to FIG. 1, there is shown a sheet transporting apparatus 1 for files of discrete commodities in the form of paper stacks wherein each file comprises a succession of stacks 2A, 2B or 2C. The neighboring stacks 2A, 2B, 2C form rows extending transversely of the direction of forward movement (note the arrow X) of such rows. The horizontal or nearly horizontal path along which the rows of stacks 2A to 2C are advanced stepwise in the direction of arrow X is defined by one or more sheet metal platforms or tables 3 one of which is shown in the upper part of FIG. 2.

The apparatus 1 comprises three transporting units 4A, 4B and 4C which respectively serve for stepwise transport of the files of stacks 2A, 2B and 2C along the upper sides of the corresponding platforms 3. The transporting units 4A to 4C are installed at a level below the preferably horizontal platforms 3. Each of the transporting units 4A to 4C comprises three endless flexible sheet-advancing conveyors in the form of toothed belts 6a, 6b, 6c which are disposed in parallel vertical planes and are respectively trained about rotary elements in the form of toothed pulleys, 7a'-7a", 7b'-7b" and 7c'-7c". The belts 6a, 6b, 6c are respectively provided with entraining means in the form of projections or lobes 8a, 8b, and 8c which are rigidly secured to the respective belts. The length of the projections 8a, 8b and 8c is such that they can extend upwardly between and beyond the upper sides of the platforms 3 and into the path of movement of stacks 2A, 2B, 2C to such an extent that they can engage the respective (front or rear) edge faces of the stacks 2A, 2B, 2C all the way between the undersides and the upper sides thereof. As can be seen in the upper portion of FIG. 2, the projections 8b and 8c which travel with the horizontal upper reaches of the respective belts 6b, 6c extend upwardly and beyond the upper sides of the respective stacks 2a.

The toothed pulleys 7a' to 7c" of the transporting units 4A, 4B and 4C are installed in discrete frames 11 each of which comprises two spaced parallel sidewalls or cheeks 9 (see also FIG. 3) extending in parallelism with the direction indicated by the arrow X. The frames 11 are omitted in FIG. 2 for the sake of clarity. Such frames are installed in a guide 12 of a housing 13 and rest on a crosshead 14 of the housing 13.

Suitable clamping means (not specifically shown) separably secure the frames 11 to the guide 12; when the clamping means are loosened or removed, the frames 11 can be shifted in the longitudinal direction of the guide 12, i.e., transversely of the direction indicated by the arrow X, to thus convert the transporting units 4A, 4B and 4C for the handling of stacks having different widths. If desired or necessary, one or more additional transporting units can be installed in the housing 13, or one or two transporting units (e.g., the units 4B and 4C) can be removed from such housing. This depends on the desired number of stacks in each transversely extending row, i.e., each such row can consist of a single stack or of two or more stacks, depending on the nature of the treating station which follows the improved transporting apparatus.

The transporting units 4A, 4B and 4C are preferably identical or of similar design. The details of one such transporting unit are shown in FIGS. 3 and 4. As can be seen in FIG. 3, the cheeks 9 of a frame 11 are connected to each other by a transversely extending shaft 16 (first shaft means) which carries annular gears 17a and 17b mounted on antifriction bearings 18 so that the gears can rotate on the shaft 16. The gear 17a is coaxially secured to the toothed pulley 7a' by screws or other suitable fasteners, and the gear 17b is secured to the toothed pulley 7b' as well as to an intermediate ring 19. The pulley 7c' is rotatably mounted on the intermediate ring 19. The cheeks 9 carry bolts 21a, 21b which constitute additional shafts rotatably supporting gears 22a, 22b which respectively mesh with the gears 17a, 17b and are respectively rotatable on antifriction bearings 23a, 23b. The gears 22a and 22b are further respectively in mesh with elongated driver gears 24a and 24b which are common to the transporting units 4A to 4C and are respectively mounted on shafts 26a, 26b.

FIG. 4 shows that the cheeks 9 of a frame 11 are further connected to one another by a shaft 27 (second shaft means) surrounded by a torque-transmitting sleeve 28 which rotates on a pair of antifriction bearings 20. The sleeve 28 is surrounded by and rotates with the toothed pulleys 7a" and 7c". Furthermore, the sleeve 28 is surrounded by an intermediate ring 31 which is disposed between the pulleys 7a", 7c" and carries the toothed pulley 7b" so that the latter is free to rotate with reference to the pulleys 7a" and 7c". For example, the ring 31 can be rigid with the sleeve 28, and the pulley 7b" can rotate about the ring 31.

FIG. 4 further shows that the cheeks 9 of the frame 11 are connected to each other by one or more reinforcing and stiffening elements in the form of braces 30 to thus ensure that the respective frame 11 can stand pronounced deforming stresses.

The belts 6a, 6c (second group of conveyors) flank the belt 6b (first conveyor group) of the respective transporting unit, the projections 8b of the belt 6b normally engage the front edge faces, and the projections 8a, 8c normally engage the rear edge faces of the stacks 2A, 2B or 2C on the platform 3 above the respective transporting unit.

The shaft 26a and its elongated driver gear 24a rotate the gear 22a which, in turn, rotates the gear 17a and the pulley 7a'. The latter drives the toothed belt 6a which drives the pulley 7a" and the pulley 7c" (the pulleys 7a" and 7c" are connected to each other by the torque-transmitting sleeve 28 to rotate as a unit). The pulley 7c" drives the toothed belt 6c.

The shaft 26b and its elongated driver gear 24b rotate the gears 22b and 17b (first gear means) to thus rotate the toothed pulley 7b' which, in turn, drives the toothed belt 6b.

The shafts 26a and 26b respectively carry toothed pulleys 32a and 32b. The pulley 32a is not directly secured to the shaft 26a but rather by two clamping discs 33a, 33b (see FIG. 1) which are held together by removable screws or analogous fasteners in a manner as described and shown in the aforementioned copending application Ser. No. 343,742. The clamping discs 33a, 33b are non-rotatably secured to the shaft 26a. An endless flexible element 34, here shown as a toothed belt, is trained over the pulleys 32a, 32b to normally transmit torque between the shafts 26a, 26b. When the clamping discs 33a, 33b are disengaged from the pulley 32a, the angular position of the shaft 26a with reference to the shaft 26b can be changed and/or vice versa. This changes the positions of toothed belts 6a, 6b (second group of conveyors) with reference to the toothed belt 6b (first group) in each of the transporting units 4A, 4B and 4C. In other words, the positions of projections 8a and 8c are then changed with reference to the projections 8b. When the screws for the clamping discs 33a, 33b are reapplied, the conversion of the apparatus for stepwise transport of differently dimensioned (longer or shorter) stacks 2A, 2B, 2C is completed.

The toothed belt 34 forms part of a variable transmission 36 which renders it possible to drive the shafts 26a, 26b periodically at different speeds, namely, the shaft 26a at a first rotational speed and the shaft 26b at a different second rotational speed. The transmission 36 further comprises two guide members here shown as toothed pulleys 37a, 37b which are respectively mounted on stationary shafts 137a, 137b and constitute idler pulleys. Still further, the transmission 36 comprises two loop forming pulleys 39a, 39b which are rotatably mounted on a common holder 38 forming part of a shifting means for the pulleys 37a, 37b. As shown in the lower left-hand portion of FIG. 2, the belt 34 is trained over the pulleys 24a, 24b, over the pulleys 37a, 37b and over the pulleys 39a, 39b in such a way that it forms a first loop 34a in its reach extending between the pulleys 24a, 24b (the pulley 39a can be said to constitute a dancer roll which is located in the bight of the loop 34a) and a second loop 34b in its reach extending between the pulleys 37a, 37b (the pulley 39b can be said to constitute a dancer roll in the bight of the loop 34b). The holder 38 for the pulleys or dancer rolls 39a, 39b is movable up and down by a link 41 which is attached to the free end of a one-armed lever 46 fulcrumed at 44 and carrying a roller follower 43 tracking a rotary disc cam 42. The parts 38, 41, 42, 43, 44, 46 together constitute an adjusting means 40 for the pulleys 39a, 39b, namely, a means for changing the lengths of the loops 34a and 34b and for thereby changing the angular position of the shaft 26a with reference to the shaft 26b. The cam 42 receives torque from the main prime mover 152 of the production line which embodies the apparatus of the present invention, e.g., a production line for the making of steno pads or other types of stationery products.

It is clear that some or all of the various belts and pulleys which are shown in the drawing can be respectively replaced by chains and sprocket wheels without departing from the spirit of the invention.

If the holder 38 with the pulleys 39a, 39b is moved upwardly against the opposition of a spring or the like (not shown) which biases the roller follower 43 on the intermediate portion of the lever 46 against the periphery of the cam 42, the length of the loop 34a is reduced and the length of the loop 34b is increased accordingly. If the pulley 32b is held against rotation, such upward movement of the holder 38 entails a rotation of the pulley 32a in a counterclockwise direction, as viewed in FIG. 2. In other words, the belts 6a and 6c move rearwardly (counter to the direction which is indicated by the arrow X) so that the distance between the projections 8a and 8c on the one hand (these projections engage the trailing edge faces of the stacks 2A to 2C) and the projections 8B on the other hand (the projections 8b engage the leading edge faces of the stacks 2A to 2C) increases. In other words, the projections 8a, 8c and 8b provide more room for insertion of paper stacks therebetween.

Figure 2:
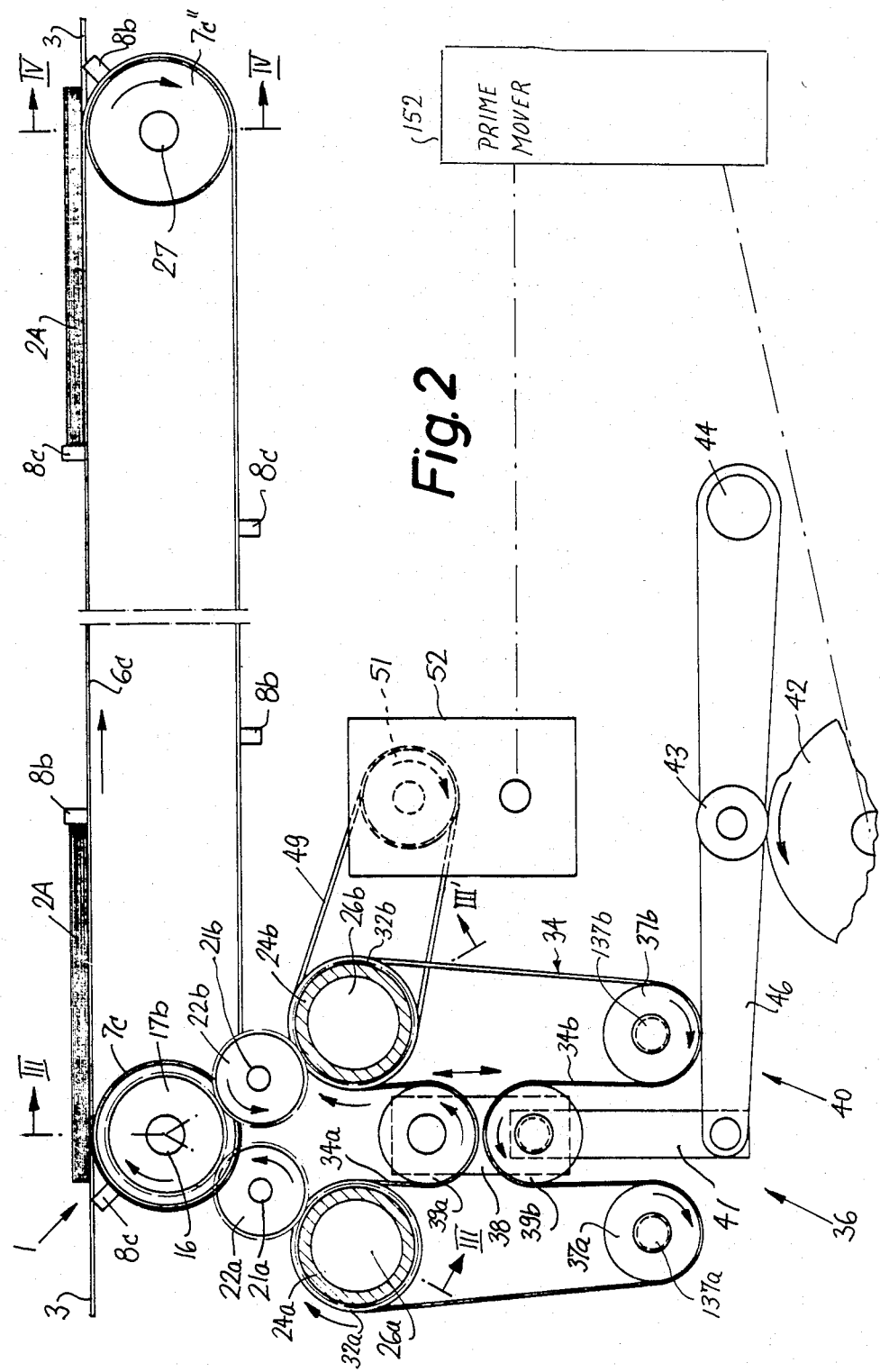
FIG. 2 is an enlarged longitudinal vertical sectional view of the apparatus as seen in the direction of arrows from the line II—II of FIG. 1, showing the stepping motor means and the transmission means for driving the conveyors of one of the transporting units.

If the pulley 32b is driven in a clockwise direction, as viewed in FIG. 2, the belts 6a and 6c do not perform any movement counter to the direction of arrow X while the distance between the roller follower 43 and the axis of the cam 42 remains unchanged. All that happens is that the belts 6a, 6c or each transporting unit (4A, 4B, 4C) lag behind the corresponding median belts 6b.

If the holder 38 is moved downwardly (i.e., if the aforementioned spring moves the roller follower 43 nearer to the axis of rotation of the cam 42), the length of the loop 34a is increased and the length of the loop 34b decreases accordingly. Therefore, the projections 8a, 8c of the belts 6a, 6c move nearer to the respective projections 8b.

The shaft 26b carries a further toothed pulley 48 (FIG. 1) for a toothed belt 49 which is further trained over the toothed pulley 51 on the output shaft of a stepping motor 52 receiving motion from the main prime mover 152 of the production line.

The operation of the stepping motor 52 is synchronized with the operation of the transmission 36 (by appropriate configuration of the cam 42) in such a way that, in the positions of parts which are shown in FIG. 2 (i.e., during transfer of a row of paper stacks 2A to 2C onto the transporting units 4A to 4C), the distance between each leading or front projection 8b and the respective rear or trailing projections 8a, 8c exceeds the length of a stack 2A, 2B or 2C (as considered in the direction of arrow X). This facilitates and simplifies the delivery of rows of commodities 2A to 2C into the range of the respective transporting units 4A to 4C. The advantage of such mode of operation will be readily appreciated since the movements of the oncoming rows of commodities 2A to 2C need not exactly conform to varying speeds of the belts 6a to 6c in the respective transporting units 4A to 4C. The varying speeds of the belts 6a to 6c in each of the transporting units 4A to 4C are attributable to the provision of the stepping motor 52 in addition to the provision of the transmission 36.

After the projections 8a and 8c begin to move about the shaft 16 and upwardly through the slots between the platforms 3 of the transporting appartus 1, these projections begin to move nearer to the respective front projections 8b so that each commodity (2A, 2B, 2C) of a freshly admitted row of commodities assumes a predetermined position with reference to the previously advanced row of commodities. In other words, the front edge faces of freshly admitted commodities 2A to 2C are caused to move against the respective front projections 8b while the rear edge faces of such commodities are engaged by the corresponding pairs of projections 8a and 8c.

The configuration of the peripheral face of the cam 42 is such that, when a row of commodities 2A to 2C moves close to the front or discharge end of the apparatus 1, namely, close to the front pulleys 7a", 7b", 7c" the transmission 36 and the stepping motor 52 cooperate to reduce the speed of the pairs of trailing projections 8a, 8c with reference to the respective front projections 8b to thus allow for more convenient removal of the foremost row of commodities 2A to 2C from the apparatus, e.g., by resort to so-called band tongs, without the need for an acceleration of the commodities because the spacing which is provided as a result of deceleration of the projections 8a, 8c with reference to the projections 8b allows for unimpeded descent of the trailing projections 8a, 8c to a level below the platforms 3 when such projections reach the shaft 27 at the discharge end of the respective transporting unit. In other words, the projections 8a, 8c are retracted from the trailing edges of the respective commodities in good time before they begin to descend to a level below the plane of the platforms 3.

The aforedescribed movements of projections 8a, 8c with reference to the associated projections 8b do not affect the appearance and/or quality of those commodities 2A to 2C which are not in the process of being delivered to or removed from the apparatus because such relative movements do not affect the placing of each and every row of a long series of rows of commodities into a predetermined position with reference to the preceding row. Thus, there is a stage of transport of each row of commodities when the leading edge faces of such commodities are engaged by the projections 8b while the trailing edge faces of the commodities are engaged by the corresponding projections 8a, 8c to thereby ensure accurate positioning of the row with reference to the immediately preceding row. Relative movements of the projections 8b and 8a, 8c or vice versa can also take place while the stepping motor 52 is idle.

The transporting units 4A, 4B, 4C can properly receive and properly transport successive stacks of the respective files of stacks irrespective of whether or not the stacks are delivered thereto at identical intervals. This is due to the fact that the transmission 36 comprises means 40 for intermittently changing the angular position of the shaft 26a relative to the shaft 26b so that the projections 8b move ahead of the projections 8a, 8c immediately therebehind with the result that a fresh stack 2A, 2B or 2C can be delivered into the range of the respective transporting unit 4A, 4B or 4C even if its spacing from the preceding stack is not normal, i.e., even if such spacing is greater or smaller than the anticipated (normal or average) distance between successive stacks of a file. Consequently, the front edge face of a stack which moves onto a platform 3 can be spaced apart from the respective projection 8b without risking damage to its rear edge face as a result of engagement of such rear edge face by the respective projections 8a and 8c. The projections 8a, 8c emerge from the respective slots in the platforms 3 behind the trailing edge face of the stack and are thereupon accelerated with reference to the associated projections 8b to ensure that the stack is moved toward and against the projection 8b not later than at the time when the projections 8a, 8c are decelerated again to allow for unimpeded transfer of the stack from the respective transporting unit. The projections 8a, 8b and 8c can also perform an orienting or aligning function, i.e., they ensure that each freshly delivered stack is properly aligned with the preceding stacks of the same file (on the transporting unit 4A, 4B or 4C) not later than when the stack is ready to leave the corresponding transporting unit. This is due to the fact that the conveyors 6a and 6c (which carry the projections 8a, 8b serving to engage the trailing edge faces of the respective stacks) flank the centrally located conveyors 6b and that the projections 8b of the belts 6b are located midway of substantially midway between the associated projections 8a, 8c, as considered at right angles to the direction of transport of stacks along the platforms 3.

Since the projections 8a, 8c are decelerated relative to the corresponding projections 8b before a stack is advanced beyond the respective transporting unit, such stack need not be accelerated at the time it leaves the apparatus. The movements of projections 8a, 8c toward and away from the associated projections 8b do not affect the orientation of stacks, the position of sheets in such stacks and/or the appearance of the front or rear edge faces of the stacks because the acceleration of the projections 8a, 8c can be sufficiently gradual to avoid undue stressing of the stacks and/or their sheets during delivery of fresh stacks to the transporting unit. In fact, and as already mentioned above, movements of the projections 8a, 8c relative to the associated projections 8b can be resorted to for effecting proper orientation of each stack prior to advancement of such stack beyond the pulleys 7a", 7b", 7c" of the corresponding transporting unit. Deceleration of projections 8a, 8c relative to the corresponding projections 8b at the discharge ends of the transporting units evidently cannot affect the appearance and/or other characteristics of the stacks.

An advantage of the feature that the transmission 36 can (if desired) change the angular position of the shaft 26a relative to the shaft 26b while the motor 52 is idle between successive rotations of the two shafts is that the stacks 2A, 2B and/or 2C can be shifted sideways while the conveyor belts 6a to 6c are idle and the projections 8a, 8c are sufficiently remote from the associated projections 8b to allow for convenient lateral shifting of the stacks at the upper sides of the platforms 3.

The provision of a common prime mover (152) for the stepping motor 52 and the cam 42 of the transmission 36 allows for highly accurate and relatively simple synchronization of the operation of the motor with the operation of the transmission.

The mechanism including the discs 33a, 33b renders it possible to rapidly convert the apparatus for the transport of longer or shorter stacks. As mentioned above, this mechanism enables an operator to change the angular position of the shaft 26 a relative to the shaft 24a, motor 52 and transmission 36 by the simple expedient of loosening the screws for the clamping discs 33a, 33b.

Conveyors in the form of toothed belts are preferred at this time because they require a minimum of maintenance.

An important advantage of the improved apparatus is that each of the stiff frames 11 can be shifted relative to the neighboring frame or frames with a minimum of effort and with a high degree of reproducibility. Moreover, the condition of the belts 6a–6c (such as their tension) does not undergo any changes when a transporting unit is shifted relative to the other units by moving it at right angles to the direction which is indicated by the arrow X. This is due to the fact that each frame 11 is a self-sustaining rigid unit and that the axial length of the driver gears 24a, 24b suffices to ensure that these gears respectively remain in mesh with the gears 22a, 22b of all of the units 4A–4C irrespective of the selected position of any one of these units with reference to the other unit of units.

Another important advantage of the improved apparatus is that any repairs which are needed in a selected transporting unit (4A, 4B or 4C) can be carried out without necessitating even partial dismantling of the other transporting units. For example, the replacement of a rear or front pulley (7a', 7b', 7c' or 7a'', 7b'', 7c'') in a given transporting unit does not necessitate the dismantling of the shaft 26a or 26b because each transporting unit comprises its own first shaft means (16) and its own second shaft means (27) for the respective pulleys (7a'–7c'' and 7a'–7c''). It will be readily appreciated that the removal of a selected pulley from a shaft 16 or 27 takes up but a fraction of the time which is needed to remove one of say nine pulleys from a shaft which carries all nine pulleys. In accordance with the present invention, the frame 11 of the transporting unit which requires inspection and/or repair is simply detached from the housing 13 and is thereupon inspected and/or repaired while the condition of each remaining transporting unit remains unchanged. Moreover, it is possible to furnish the apparatus with one or more spare transporting units so that a defective transporting unit can be immediately replaced with a spare unit and the apparatus can be restarted while the defective transporting unit is being inspected, repaired or readied for shipment back to the manufacturer. This considerably reduces the down times of the transporting apparatus and does not require the presence of skilled or highly skilled mechanics at the locale of the use of the apparatus.

The placing of first gears 17a, 17b or each gear means (17a, 22a and 17b, 22b) on a common shaft (16) also contributes to simplicity of the apparatus, i.e., to simplicity of the individual transporting units. The first gears 17a, 17b remain in mesh with the second gears (22a, 22b) of the respective gear means at all times, i.e., even if a selected transporting unit is removed from the housing 13. As can be seen in FIG. 4, one of the front-pulleys (7a'', 7c) transmits torque to the other of these pulleys by the simple expedient of rotatably mounting on the front shaft 27 a sleeve 28 or an analogous torque transmitting element which connects the pulleys 7a'', 7c'' of the respective unit 4A, 4B or 4C with one another and serves as a bearing for the centrally located pulley 7b''. The latter is driven by the belt 6b which, in turn, is driven by the respective gear 17b through the medium of the pulley 7b'.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptions should and are intended to be comprehended within the meaning and range of equivalence of the appended claims.

We claim:

1. Apparatus for stepwise transport of several files of discrete commodities in a predetermined direction and along a predetermined path, particularly for transporting stacks of paper sheets or the like, comprising a housing; a battery of neighboring transporting units each including a self-sustaining frame mounted in said housing, more than two endless parallel conveyors each having at least one projection arranged to extend into and from said path in response to movement of the respective conveyor in said direction, said conveyors including a first group having at least one conveyor whose projection is located ahead of and a second group having at least one conveyor whose projection is located behind a commodity in said path, first and second rotary elements for each of said conveyors and each conveyor being trained over the respective rotary elements, and first and second shaft means mounted in the frame and rotatably supporting the first and second rotary elements; and common drive means for said conveyors including first and second gear means for respectively rotating the rotary elements for said first and second groups of conveyors, first and second driver gears respectively meshing with the first and second gear means of said units, and means for intermittently rotating said driver gears including a third shaft arranged to drive said fist gear means via said first driver gear, a fourth shaft arranged to drive said second gear means via said second driver gear, stepping motor means arranged to intermittently rotate said third and fourth shafts, and transmission means interposed between said motor means and said third and fourth shafts, said transmission means including means for intermittently changing the angular position of one of said third and fourth shafts with reference to the other of said third and fourth shafts to thereby change the spacing between the projection of each conveyor in one of said groups and the projection of each conveyor in the other of said groups so that the projections of the conveyors of said groups are spread apart or moved nearer to each other to thus permit delivery of commodities into and predictable transport of commodities along said path, the axes of said rotary elements, said gear means and said driver gears being normal to said direction and the entire frame of at least one of said units being adjustable with reference to said housing in parallelism with said axes, the axial length of said driver gears being such that the first and second gear means of said one unit remain in mesh with the corresponding driver gears in all positions of adjustment of the frame of said one unit.

2. The apparatus of claim 1, wherein each of said first groups comprises one endless flexible conveyor and each of said second groups comprises two endless flexible conveyors flanking the flexible conveyor of the first group.

3. The apparatus of claim 1, wherein each of said units further comprises first and second additional shafts mounted in the respective frame and each of said first and second gear means comprises a first gear mounted on the respective first shaft means and arranged to drive the rotary elements for the conveyors of the respective groups and a second gear mounted on the respective additional shaft, meshing with the respective first gear and also meshing with the respective driver gear.

4. The apparatus of claim 1, wherein said third and fourth shafts are respectively coaxial with and arranged to transmit torque to said first and second driver gears.

5. The apparatus of claim 1, wherein each of said gear means comprises a gear mounted on the respective first shaft means and coaxial with the respective rotary elements.

6. The apparatus of claim 1, wherein each of said second groups comprises two conveyors flanking the conveyor of the respective first group and said first and second gear means of each of said units comprise first gears mounted on the respective first shaft means and respectively arranged to rotate the first rotary elements for the conveyors of the respective first and second groups.

7. The apparatus of claim 6, wherein the first and second gear means of each of said units further comprise second gears meshing with the corresponding first gears and said first and second driver gears.

8. The apparatus of claim 6, wherein the first gear of each second gear means is rigid with the first rotary element for one conveyor of the respective pair and the first rotary element for the other conveyor of the respective pair is rotatably installed between the first rotary element for the conveyor of the respective first group and the first gear of the respective first gear means.

9. The apparatus of claim 1, wherein the second shaft means in each of said frames comprises a single shaft which is common to the respective second rotary elements.

10. The apparatus of claim 1, wherein each of said second groups comprises several conveyors and further comprising means for transmitting torque between the second rotary elements for the conveyors of the second group in each of said units.

11. The apparatus of claim 10, wherein each of said torque transmitting means comprises a sleeve coaxially surrounding and rotatable relative to the second shaft means of the respective units.

12. The apparatus of claim 10, wherein the second rotary element for the conveyor of each first group is rotatable on the respective torque transmitting means.

* * * * *